(12) United States Patent
Aoyagi et al.

(10) Patent No.: US 9,362,561 B2
(45) Date of Patent: Jun. 7, 2016

(54) POSITIVE ELECTRODE MATERIAL FOR NON-AQUEOUS ELECTROLYTE SECONDARY BATTERY

(71) Applicant: HONDA MOTOR CO., LTD., Tokyo (JP)

(72) Inventors: Shintaro Aoyagi, Saitama (JP); Yuji Isogai, Saitama (JP); Akihiro Yoshizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/660,174

(22) Filed: Mar. 17, 2015

(65) Prior Publication Data

US 2015/0270546 A1    Sep. 24, 2015

(30) Foreign Application Priority Data

Mar. 19, 2014 (JP) .................. 2014-056418
Feb. 16, 2015 (JP) .................. 2015-027625

(51) Int. Cl.
| | |
|---|---|
| *H01M 4/58* | (2010.01) |
| *H01M 4/136* | (2010.01) |
| *H01M 4/62* | (2006.01) |
| *H01M 4/36* | (2006.01) |
| *H01M 4/02* | (2006.01) |

(52) U.S. Cl.
CPC ............ *H01M 4/5825* (2013.01); *H01M 4/136* (2013.01); *H01M 4/364* (2013.01); *H01M 4/582* (2013.01); *H01M 4/625* (2013.01); *H01M 2004/028* (2013.01); *Y02E 60/122* (2013.01)

(58) Field of Classification Search
CPC ... H01M 4/5825; H01M 4/364; H01M 4/582; H01M 4/136; H01M 4/625; H01M 2004/028; Y02E 60/122
See application file for complete search history.

(56) References Cited

U.S. PATENT DOCUMENTS

2012/0219859 A1* 8/2012 Doe .................... H01M 4/5825
                                                             429/221

FOREIGN PATENT DOCUMENTS

JP    2008-130265    6/2008

* cited by examiner

*Primary Examiner* — Laura Weiner
(74) *Attorney, Agent, or Firm* — Rankin, Hill & Clark LLP

(57) ABSTRACT

Provided is a positive electrode material for a non-aqueous electrolyte secondary battery, having an energy density and a power density higher than those of a positive electrode material for a non-aqueous electrolyte secondary battery employing only iron fluoride as the positive electrode active material. The positive electrode material for a non-aqueous electrolyte secondary battery is characteristic in including a first positive electrode active material represented by a general formula: $Fe_{(1-x-2y)}Na_xCo_yF_{3-2(x+2y)}$ ($0<x\leq0.4$, $0<y\leq0.1$) and a second positive electrode active material composed of $LiFePO_4$ having a surface coated with carbon.

7 Claims, No Drawings

POSITIVE ELECTRODE MATERIAL FOR NON-AQUEOUS ELECTROLYTE SECONDARY BATTERY

BACKGROUND OF THE INVENTION

1. Field of the Invention

The present invention relates to a positive electrode material (cathode material) which can be suitably used for a chargeable and dischargeable non-aqueous electrolyte secondary battery.

2. Description of the Related Art

It is known that a metal fluoride such as iron fluoride is used as a positive electrode active material used in a positive electrode material for a chargeable and dischargeable non-aqueous electrolyte secondary battery (see, for example, Japanese Patent Laid-Open No. 2008-130265). The iron fluoride, when used as a positive electrode active material for the non-aqueous electrolyte secondary battery, is said to be able to improve the charge and discharge characteristics such as a charge and discharge capacity and an energy density of the non-aqueous electrolyte secondary battery.

The present inventors have investigated the iron fluoride used as the positive electrode active material for the non-aqueous electrolyte secondary battery and have found that partial replacement of Fe constituting iron fluoride with atoms having an ionic radius larger than that of Fe further improves the charge and discharge capacity and the energy density. Examples of the atom having an ionic radius larger than that of Fe include Na and Co or the like.

However, further improvements in the positive electrode active material in which Fe is partially replaced with Na and Co or the like are required from the viewpoint of the power density of the non-aqueous electrolyte secondary battery.

It is thus an object of the present invention to provide a positive electrode material for a non-aqueous electrolyte secondary battery, the material having an energy density and a power density higher than those of a positive electrode material for a non-aqueous electrolyte secondary battery employing only iron fluoride as the positive electrode active material.

SUMMARY OF THE INVENTION

To achieve the object described above, a positive electrode material for a non-aqueous electrolyte secondary battery of the present invention is characterized in comprising a first positive electrode active material represented by a general formula $Fe_{(1-x-2y)}Na_xCo_yF_{3-2(x+2y)}$ ($0<x\leq0.4$, $0<y\leq0.1$) and a second positive electrode active material composed of $LiFePO_4$ having a surface coated with carbon.

The positive electrode material for a non-aqueous electrolyte secondary battery of the present invention includes a first positive electrode active material in which Fe constituting iron fluoride ($FeF_3$) is partially replaced with Na and Co. The positive electrode material for a non-aqueous electrolyte secondary battery of the present invention thus can provide a higher energy density than a positive electrode material composed of only a positive electrode active material composed of iron fluoride in which no portion of Fe is replaced with other atoms.

Partial replacement of Fe constituting $FeF_3$ with Na and intercalation of Na into the crystalline structure of $FeF_3$ in the first positive electrode active material can extend its region into and from which a negative electrode active material, for example, $Li^+$ is intercalated or deintercalated, achieving a high energy density. The higher the ratio of Na replacement x in the first positive electrode active material, the higher the energy density is, but it is not preferable if x exceeds 0.4 because a sodium fluoride (NaF) phase, which does not contribute to the capacity, is generated.

Partial replacement of Fe constituting $FeF_3$ with Co and intercalation of Co into the crystalline structure of $FeF_3$ in the first positive electrode active material can provide a high discharge potential and a high electrical conductivity. The higher the ratio of Co replacement y in the first positive electrode active material, the higher the discharge potential and the electrical conductivity become but it is not preferable if y exceeds 0.1 because an impurity phase occurs in the crystal.

The positive electrode material for a non-aqueous electrolyte secondary battery of the present invention, further contains $LiFePO_4$ having a surface coated with carbon as the second positive electrode active material, which can provide a high power density as a positive electrode material. The second positive electrode active material, which has a surface coated with carbon, can provide a high electrical conductivity. "Coated" herein means that 30 to 100% of the surface of the second positive electrode active material is covered with carbon.

Accordingly, the positive electrode material of the present invention can obtain an energy density and a power density higher than those of a positive electrode material employing only a positive electrode active material composed of iron fluoride in which no portion of Fe is replaced with other atoms.

A mass ratio between the first positive electrode active material and the second positive electrode active material is preferably in a range of 90:10 to 50:50, which allows a positive electrode material having an excellent balance of an energy density and a power density to be provided.

If an amount of the first positive electrode active material exceeds 90% by mass with respect to the total amount of the first positive electrode active material and the second positive electrode active material, the relative amount of the second positive electrode active material becomes smaller and there are cases when sufficient power density cannot be obtained. Alternatively, if an amount of the second positive electrode active material exceeds 50% by mass with respect to the total amount of the first positive electrode active material and the second positive electrode active material, the relative amount of the first positive electrode active material becomes smaller, and sufficient energy density may not be obtained.

The positive electrode material of the present invention preferably further contains a conductive assistant. This allows the positive electrode material to improve the electrode stability and the electrical conductivity. In this case, the content of the conductive assistant is preferably in a range of 5 to 15% by mass with respect to a total of the first positive electrode active material, the second positive electrode active material, and the conductive assistant. The positive electrode material of the present invention thus improves the electrode stability and the electrical conductivity while maintaining the charge and discharge capacity and power density at a high value.

An amount of the conductive assistant less than 5% by mass with respect to the total amount of the first positive electrode active material, the second positive electrode active material, and the conductive assistant may fail to improve the electrode stability and the electrical conductivity of the positive electrode material of the present invention. Alternatively, if an amount of the conductive assistant exceeds 15% by mass with respect to the total amount of the first positive electrode active material, the second positive electrode active material, and the conductive assistant, the relative amount of the first positive electrode active material and the second positive electrode active material becomes smaller, thereby failing to sufficiently improve the energy density and power density.

DETAILED DESCRIPTION OF THE PREFERRED EMBODIMENT

The positive electrode material for a non-aqueous electrolyte secondary battery of the present invention contains a first positive electrode active material represented by a general formula: $Fe_{(1-x-2y)}Na_xCo_yF_{3-2(x+2y)}$ ($0<x\leq0.4$, $0<y\leq0.1$) and a second positive electrode active material composed of $LiFePO_4$ having a surface coated with carbon.

Partial replacement of Fe constituting $FeF_3$ with Na and intercalation of Na into the crystalline structure of $FeF_3$ in the first positive electrode active material can obtain a high energy density. Partial replacement of Fe constituting $FeF_3$ with Co and intercalation of Co into the crystalline structure of $FeF_3$ in the first positive electrode active material can also obtain a high discharge potential and a high electrical conductivity.

The second positive electrode active material, which is composed of $LiFePO_4$ can generate high power to thereby provide a high power density by suppressing a reduction in the discharge voltage due to the internal resistance even when subjected to a higher electrical current compared to iron fluoride.

Alternatively, $LiFePO_4$, which is in the form of a phosphate, has a more stable structure than $LiFeO_2$. In contrast, $LiFePO_4$ may be inferior in the electrical conductivity, but the second positive electrode active material of the present invention can provide a high electrical conductivity because its surface is coated with carbon having an electrical conductivity.

$LiFePO_4$ includes relatively inexpensive and low-toxic Fe compared to other positive electrode active material such as $LiCoO_2$, and thus is more cost efficient.

Accordingly, the positive electrode material for a non-aqueous electrolyte secondary battery of the present invention, which includes a combination of the first positive electrode active material and the second positive electrode active material, can improve the power density compared to when only the first positive electrode active material is used as the positive electrode active material, and can provide an energy density higher than that of a positive electrode material composed of only a positive electrode active material composed of iron fluoride in which no portion of Fe is replaced with other atoms.

The mass ratio between the first positive electrode active material and the second positive electrode active material can be appropriately selected depending on performance required in the applied non-aqueous electrolyte secondary battery (for example, which of the energy density and the power density should have more importance). To achieve a positive electrode material having an excellent balance of an energy density and a power density in this case, the mass ratio between the first positive electrode active material and the second positive electrode active material is preferably in the range of 90:10 to 50:50, more preferably in the range of 80:20 to 60:40.

The positive electrode material for a non-aqueous electrolyte secondary battery of the present invention preferably also includes a conductive assistant in addition to the first and second positive electrode active materials. By including the conductive assistant in the range of 5 to 15% by mass with respect to the total of the first and second positive electrode active materials and the conductive assistant, the positive electrode material for a non-aqueous electrolyte secondary battery of the present invention can reduce the internal resistance of the secondary battery, facilitate migration of the negative electrode active material, for example, $Li^+$, and improve the electrode stability and the electrical conductivity of the positive electrode material.

A content of the conductive assistant less than 5% by mass with respect to the total of the first and second positive electrode active materials and the conductive assistant may fail to improve the electrode stability and the electrical conductivity of the positive electrode material of the present invention. Alternatively, a content of the conductive assistant more than 15% by mass with respect to the total of the first and second positive electrode active materials and the conductive assistant may cause the relative amount of the first and second positive electrode active materials to be lower to thereby make it difficult to obtain a sufficient energy density and power density as the positive electrode material.

Examples of the conductive assistant include carbon black, Ketjenblack, acetylene black, and carbon nanotubes, or the like.

The first and second positive electrode active materials can be manufactured by using known methods. For example, $LiFePO_4$ having a surface coated with carbon as the second positive electrode active material can be manufactured by adding a carbon source to a $LiFePO_4$ precursor produced by a liquid phase process or solid phase process, and sintering it under an inert atmosphere or reducing atmosphere.

Examples and Comparative Examples of the present invention will now be described.

Example 1

1. Preparation of a First Positive Electrode Active Material

Iron chloride hexahydrate and cobalt chloride were dissolved in ultra pure water so as to achieve a Fe ion concentration of 0.1 mol/L and an amount of Co ions of 5 atomic % with respect to the Fe ions to thereby prepare a first solution.

Subsequently, sodium hydroxide was dissolved in ultra pure water to become 0.1 mol/L to thereby prepare a second solution.

458 g of the second solution was slowly added dropwise to 169 g of the first solution, and stirred at room temperature (25° C.) to form a precipitate. A step of filtering the resulting precipitate under reduced pressure and redispersing the precipitate in ultra pure water was repeated twice to thereby remove impurities included in the precipitate.

The precipitate, after the impurities were removed, was dispersed in ultra pure water, to which 100 ml of a 40% by mass HF aqueous solution was slowly added dropwise, and stirred at room temperature (25° C.) and in an oil bath (75° C.). After stirring, the dispersion was centrifuged, and the resulting precipitate was dried by using a hot plate.

The dried powder ($Fe_{(1-x-2y)}Na_xCo_yF_{3-2(x+2y)}\cdot 3H_2O$) was fired in a tubular furnace filled with Ar at 250° C. for 12 hours to thereby obtain a powder of $Fe_{(1-x-2y)}Na_xCo_yF_{3-2(x+2y)}$.

The composition of the resulting powder was determined by analysis on an inductively coupled plasma atomic emission spectrometer (ICP-AES) to be $Fe_{0.883}Na_{0.011}Co_{0.053}F_{2.77}$.

2. Production of a Positive Electrode 0.9 g of the first positive electrode active material obtained in the present Example and 0.1 g of a conductive assistant (Ketjenblack: manufactured by Lion Corporation, Ketjenblack ECP300JD) were mixed using a ball mill to obtain a first mixture.

Subsequently, 0.9 g of the second positive electrode active material ($LiFePO_4$ having a surface 30 to 100% of which is coated with carbon (manufactured by Hohsen Corporation)) and 0.1 g of a conductive assistant (Ketjenblack: manufactured by Lion Corporation, Ketjenblack ECP300JD) were dispersed in 30 ml of ethanol (manufactured by Wako Pure Chemical Industries, Ltd.) and stirred using a thin-film spin system high-speed mixer (manufactured by PRIIVIIX Corporation). After stirring, it was dried under reduced pressure with an evaporator thereby obtaining a second mixture.

Next, 0.778 g of the first mixture, 0.222 g of the second mixture, 0.111 g of polyvinylidene fluoride (manufactured by KUREHA CORPORATION), and 1.269 g of N-methylpyrrolidine (manufactured by Wako Pure Chemical Industries, Ltd.) were mixed using a planetary centrifugal mixer (manufactured by THINKY CORPORATION) to thereby prepare a slurry for coating.

The slurry for coating was applied on an aluminum foil current collector, after being dried, roll-pressed to produce a positive electrode.

The mass ratio between the first positive electrode active material and the second positive electrode active material included in the positive electrode provided in this Example was 78:22, and the proportion of the conductive assistant was 10% by mass with respect to the total of the first and second positive electrode active materials and the conductive assistant.

3. Production of a Non-Aqueous Electrolyte Secondary Battery

SUS mesh (100 mesh) having a diameter of 15 mm was welded on an SUS plate having a diameter of 15 mm and a thickness of 0.3 mm to provide a current collector, on which Li foil having a diameter of 15 mm and a thickness of 0.1 mm was bonded to provide a negative electrode.

Subsequently, the positive electrode provided in the present Example and the negative electrode were laminated via a separator composed of a polypropylene microporous film having a diameter of 17 mm and a thickness of 0.25 mm Next, the separator was impregnated with a non-aqueous electrolytic solution to obtain a coin-type non-aqueous electrolyte secondary battery.

As the non-aqueous electrolytic solution, a solution in which $LiPF_6$ as a supporting electrolyte was dissolved at a concentration of 1 mol/l in a mixed solvent including ethylene carbonate and diethyl carbonate mixed at a mass ratio of 7:3 was used.

4. Performance Evaluation of the Non-Aqueous Electrolyte Secondary Battery

The charge and discharge characteristics of the coin-type non-aqueous electrolyte secondary battery obtained in the present Example were measured at room temperature (25° C.) in the atmosphere, using a voltage in the range of 1.5 to 4.5 V (vs. Li) and a current of 0.6 mA. The measuring conditions correspond to 0.03 C (discharge period of 33.3 hours) on the C rate basis.

Subsequently, based on the resulting charge and discharge curve, the energy density and the power density were calculated using the following equations. The results are shown in Table 1.

Energy density (Wh/kg)=Average discharge voltage (V)×Discharge capacity (Ah)/Positive electrode active material mass (kg)

Power density (W/kg)=Lower limit voltage (V')×Discharge current (P)/Positive electrode active material mass (kg)

Here, the discharge current (I') represents a value when the discharge voltage reaches the lower limit voltage in 10 seconds of discharge after discharge is started at a state of charge ratio of 50% (SOC=50%).

Example 2

In this Example, the first mixture was obtained in the exactly same manner as in Example 1 except that the amount of the first positive electrode active material was 0.85 g and the amount of the conductive assistant was 0.15 g.

Subsequently, the second mixture was provided in the exactly same manner as in Example 1 except that the amount of the second positive electrode active material was 0.85 g and the amount of Ketjenblack as the conductive assistant was 0.15 g.

Next, the slurry for coating was prepared to produce a positive electrode in the exactly same manner as in Example 1 except that the amount of the first mixture was 0.765 g and the amount of the second mixture was 0.235 g.

The mass ratio between the first positive electrode active material and the second positive electrode active material included in the positive electrode obtained in the present embodiment was 76.5:23.5, and the proportion of the conductive assistant was 15% by mass with respect to the total of the first and second positive electrode active materials and the conductive assistant.

Next, the coin-type non-aqueous electrolyte secondary battery was produced in the exactly same manner as in Example 1 except that the positive electrode obtained in this Example was used. The charge and discharge characteristics of the coin-type non-aqueous electrolyte secondary battery were measured, and the energy density and power density were calculated based on the resulting charge and discharge curve. The results are shown in Table 1.

Comparative Example 1

In this Comparative Example, the first mixture was provided in the exactly same manner as in Example 1 except that a $FeF_3$ powder (manufactured by Sigma-Aldrich Corporation) was used instead of the first positive electrode active material in Example 1.

Subsequently, the slurry for coating was prepared to produce a positive electrode in the exactly same manner as in Example 1 except that 1 g of the first mixture provided in this Comparative Example was used and no second mixture was used.

Next, the coin-type non-aqueous electrolyte secondary battery was produced in the exactly same manner as in Example 1 except that the positive electrode obtained in this Comparative Example was used. The charge and discharge characteristics of the coin-type non-aqueous electrolyte secondary battery were measured, and the energy density and the power density were calculated based on the resulting charge and discharge curve. The results are shown in Table 1.

TABLE 1

| | Energy density (Wh/kg - positive electrode active material) | Power density (Wh/kg - positive electrode active material) |
|---|---|---|
| Example 1 | 930 | 2608 |
| Example 2 | 988 | 2580 |
| Comparative Example 1 | 728 | 657 |

As shown in Table 1, it is clear that non-aqueous electrolyte secondary batteries that include the positive electrode material of the present invention containing the first and second positive electrode active materials (Examples 1 and 2) can achieve an energy density and a power density higher than those of the non-aqueous electrolyte secondary battery that includes a positive electrode material composed of, as the positive electrode active material, only a positive electrode active material composed of iron fluoride in which no portion of Fe is replaced with other atoms (Comparative Example 1).

What is claimed is:

1. A positive electrode material for a non-aqueous electrolyte secondary battery comprising
   a first positive electrode active material represented by a general formula $Fe_{(1-x-2y)}Na_xCo_yF_{3-2(x+2y)}$ ($0<x\leq0.4$, $0<y\leq0.1$) and
   a second positive electrode active material composed of $LiFePO_4$ having a surface coated with carbon.

2. The positive electrode material for a non-aqueous electrolyte secondary battery according to claim 1, wherein the second positive electrode active material is composed of $LiFePO_4$ having 30 to 100% of a surface coated with carbon.

3. The positive electrode material for a non-aqueous electrolyte secondary battery according to claim 1, wherein a mass ratio between the first positive electrode active material and the second positive electrode active material is in a range of 90:10 to 50:50.

4. The positive electrode material for a non-aqueous electrolyte secondary battery according to claim 1, wherein a mass ratio between the first positive electrode active material and the second positive electrode active material is in a range of 80:20 to 60:40.

5. The positive electrode material for a non-aqueous electrolyte secondary battery according to claim 1, further comprising a conductive assistant.

6. The positive electrode material for a non-aqueous electrolyte secondary battery according to claim 5, including the conductive assistant in a range of 5 to 15% by mass with respect to a total amount of the first positive electrode active material, the second positive electrode active material, and the conductive assistant.

7. The positive electrode material for a non-aqueous electrolyte secondary battery according to claim 5, wherein the conductive assistant is Ketjenblack.

* * * * *